R. MATWEFF.
COMPOSITION FOR TREATING TEETH.
APPLICATION FILED AUG. 19, 1908.
937,683.  Patented Oct. 19, 1909.
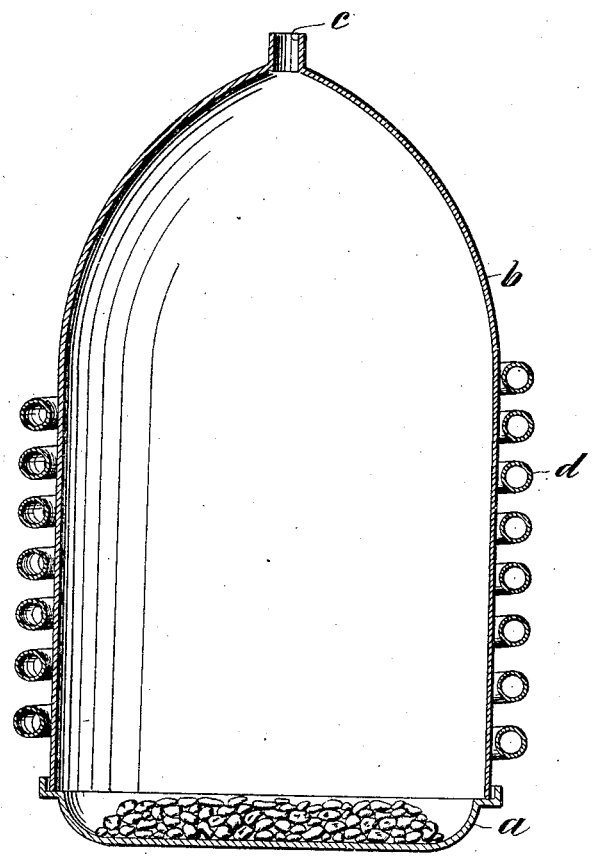
Witnesses:
W. H. Berrigan.
A. Stetson.
Inventor
Rosa Matweff
by H. Van Oldenveel
Attorney

UNITED STATES PATENT OFFICE.

ROSA MATWEFF, OF TATAR-PAZARDJIK, BULGARIA.

COMPOSITION FOR TREATING TEETH.

937,683.  Specification of Letters Patent.  Patented Oct. 19, 1909.

Application filed August 19, 1908. Serial No. 449,227.

*To all whom it may concern:*

Be it known that I, ROSA MATWEFF, of Tatar-Pazardjik, Bulgaria, and a subject of the Prince of Bulgaria, have invented a new and useful Improved Composition for Treating Teeth, of which the following is a full and clear specification.

The object of my invention is to produce a composition for stopping or filling teeth of a disinfecting nature and in which the bark of cone bearing trees such as firs, pines, yews and the like together with straw or cellulose to which tobacco can be added are used, the said materials being submitted to a process of carbonization in any suitable way.

I mix straw and cellulose with fir bark, for the reason that when heated, fir-bark develops products of distillation of a strongly disinfecting character, and the straw and cellulose, on being heated, produce a charcoal of extraordinary porosity, which, in a high degree, absorbs the disinfectant products of the distillation of fir-bark.

In carrying out my invention I take the straw, bark and cellulose (which is preferably the commercial and fairly pure grade) all in a pulverized state in the proportion of say 3, 5 and 2 and store them together with tobacco leaves until they have fully absorbed the smell of tobacco. The tobacco leaves are then removed, and the three ingredients mentioned are carbonized in any convenient manner which prevents the admission of air and allows for the products of the carbonization to escape very slightly.

The drawing hereto attached illustrates, by way of example, an apparatus in which the process forming the subject matter of the invention, may be carried out.

In the drawing hereto annexed, *a* designates a metal cup having a tight fitting and capacious cap *b*, provided above with a narrow exit *c*, said cap *b* being of sufficient size to receive all the gases developed, cooling means, represented by pipe *d*, being attached to the cap, if it is desired to cause reabsorption of the expelled gases by the charcoal resulting from the distillation. The carbonization is effected in this apparatus, and the originating products of the dry distillation drive the air out and the cap is filled with the previously mentioned distillation gases. If the whole is now allowed to cool and stand long enough, the vegetable charcoal formed absorbs a considerable part of the distillation gases generated. The pulverized residue thus obtained is a most valuable substance to be used in dentistry, as it possesses the property of being able to effectively stun the nerve of the tooth without killing it or even injuring it.

It is well known that wood-charcoal possesses anti-putrid, disinfecting and antiseptic properties and that same is employed as a substance for filling or stopping teeth and is also used as an additional ingredient for tooth powders for counteracting offensive breath. It is likewise generally usual to employ creosote either alone or as a solution mixed with some hard substance for stopping or filling teeth. This as well as other phenols, otherwise known as carbolic acid, seriously injure the teeth. But, if the bark of fir or pine trees, which contain a rich proportion of resin, is in accordance with the present invention, carbonized together with cellulose, observing the precautionary measures above mentioned, the dry-distillation products which possess particular disinfecting properties are taken up by the cellulose-carbon absorbing enormous quantities, which concentrates in itself the anti-putrid, disinfecting distillation-products and in this way gives an excellent tooth-filling substance which preëminently surpasses the wood-charcoal both in disinfecting power as well as in lasting effect. The specific variety of commercial cellulose that I preferably employ is sulfite cellulose made from pine-wood, and, for straw, I preferably employ rye-straw, but other grades of commercial cellulose and other straws give good and satisfactory results.

Having now particularly described my invention what I claim as new and desire to secure by Letters Patent is:

1. The process of producing a material for stopping and filling teeth, which consists in mixing straw, cellulose and fir-bark in a finely divided state with tobacco leaves, until the whole has taken on a strong flavor of tobacco, then removing the tobacco, subjecting the straw, bark and cellulose to destructive distillation and reabsorbing the expelled gases by the charcoal resulting from the distillation.

2. The process of producing a material for stopping and filling teeth, which consists in subjecting a mixture of straw, fir-bark and cellulose, all in a pulverized state, to destructive distillation, collecting the evolved gases, cooling the carbonized products, and causing the expelled gases to be reabsorbed by the charcoal resulting from the distillation.

In testimony whereof I affix my signature in presence of two witnesses.

ROSA MATWEFF.

Witnesses:
KARL TRAUNER,
FRITZ MAYER.